Jan. 9, 1962

F. J. HAUPT 3,016,186

TAPE READING PUNCH

Filed July 28, 1958

7 Sheets-Sheet 1

INVENTOR.
F. J. HAUPT
BY Robert H. Henderson
ATTORNEY

Jan. 9, 1962 F. J. HAUPT 3,016,186

TAPE READING PUNCH

Filed July 28, 1958 7 Sheets-Sheet 2

INVENTOR.
F. J. HAUPT
BY Robert H. Henderson
ATTORNEY

Jan. 9, 1962 F. J. HAUPT 3,016,186

TAPE READING PUNCH

Filed July 28, 1958 7 Sheets-Sheet 3

INVENTOR.
F. J. HAUPT
BY Robert H. Henderson
ATTORNEY

Jan. 9, 1962 F. J. HAUPT 3,016,186

TAPE READING PUNCH

Filed July 28, 1958 7 Sheets-Sheet 4

INVENTOR.
F. J. HAUPT

BY Robert H. Henderson

ATTORNEY

INVENTOR.
F. J. HAUPT
BY Robert H. Henderson
ATTORNEY

*INVENTOR.*
F. J. HAUPT
BY Robert H. Henderson
ATTORNEY

INVENTOR.
F. J. HAUPT
BY Robert H. Henderson
ATTORNEY

United States Patent Office 3,016,186
Patented Jan. 9, 1962

3,016,186

TAPE READING PUNCH

Frank J. Haupt, Bergenfield, N.J., assignor to The Western Union Telegraph Company, New York, N.Y., a corporation of New York Filed July 28, 1958, Ser. No. 751,210
7 Claims. (Cl. 234—28)

The present invention is concerned with tape punches for the printing telegraph and more particularly with a self-reading tape punch for immediate and direct self-reading, and capable of prompt reversal, as for the correction of errors detected thereby.

In the communications art, storage of message characters or of other information is effected by automatically punching certain holes across a strip of paper tape, the presence or absence of such a hole in each of several possible hole positions across the tape being sufficient to identify and record one character, where each consecutive character is represented by a separate transverse row of holes.

When the information desired to be transmitted comprises plain language text, it is entirely possible and feasible to check the accuracy of a completed transmission by inspection of the received message, whereupon errors become apparent because of their inconsistency with the remainder of the message, but in cases where the transmission consists solely or principally of mathematical digits, such checking must be done either by repeating the message periodically and intercomparing the received information, or by applying some algorithm such as addition, or the casting out of nines to the characters transmitted, and then transmitting the result thereof for comparison with the result of an identical procedure effected at the receiving end by being applied periodically to the received information. Since both the algorithm and the comparison can be done by machine, an erroneous transmission is readily and rapidly detected, and appropriate remedial action undertaken automatically.

In order to perform this checking of the received message with certainty, it is necessary to actually read the characters received and punched, and it is not sufficient merely to note which of the punch controlling interponent members have operated, or even which of the receiving punches have operated, as could be done for example by attaching the operating lever of an electrical switch to a moving part of each punch. This is so, firstly because the primary function of the punches is to punch, and maximum efficiency and reliability require that their arrangement and adjustment be directed to that end and not to the dual purpose of punching and operating switches. Secondly, a direct method of reading of the received message independent of the punches is required because an erroneous received message due to breakage or other failure of, or extraneous holes occurring in the tape can be detected only by this means. Mere notation of which interponent members have been actuated is an insufficient check, not only for the above reasons but also because it is sometimes possible for such a member to improperly withdraw before the punching operation and so produce an incorrect punching. Means have been provided in the present invention for overcoming this difficulty by locking in the interponent members until after completion of the punching operation, however, so that this particular malfunction does not occur.

Prior tape reading tape punches have all operated either on the above described principle of merely inferring correct punching of the tape from the detected motion of the tape punch, or else in the cases where direct reading of the tape has been employed, have required a substantial length of tape to be located between the punches and the tape reader pins. Since for practical reasons of economy, the characters punched on a tape must be closely spaced, prior tape readers have all been constructed to operate at least about ten characters behind the punch in order to provide room for the necessary structure. As a consequence of this it has not heretofore been possible to provide such a continuous check on character accuracy that upon transmission of an erroneous block of data, it could be immediately detected by the above described intercomparison of a checking algorithm, so that a repetition of the transmission could be ordered, all before further material was sent.

By means of the present invention, it is now possible automatically to check a transmission of information and upon detection of a mistake to immediately back step the receiving tape by a desired number of characters in order that a retransmission of blank characters can be made to wipe out the message wrongly received, and the same information already transmitted may be repunched in that area of the tape next following the area wrongly punched at the receiver in order to remedy the defect before going on to the transmission of any part of a new block of information.

It is therefore an object of this invention to provide a tape reading tape punch for a data transmission system which immediately reads the last character punched.

It is a further object of the invention to provide such a punch wherein the reading of the said tape is accomplished by direct sensing of the just-punched holes.

Another object is to provide a tape reading tape punch capable of stepwise operation in either the forward or backward direction according to remote command.

Still another object of the invention is to provide a tape reading punch having electrical means for releasing the punch interponent members, which is actuated only upon the completion of a punching operation.

A fuller understanding of the instant invention may be obtained from the following description of a specific illustrative example thereof, taken in conjunction with the drawings, wherein.

Figure 1:
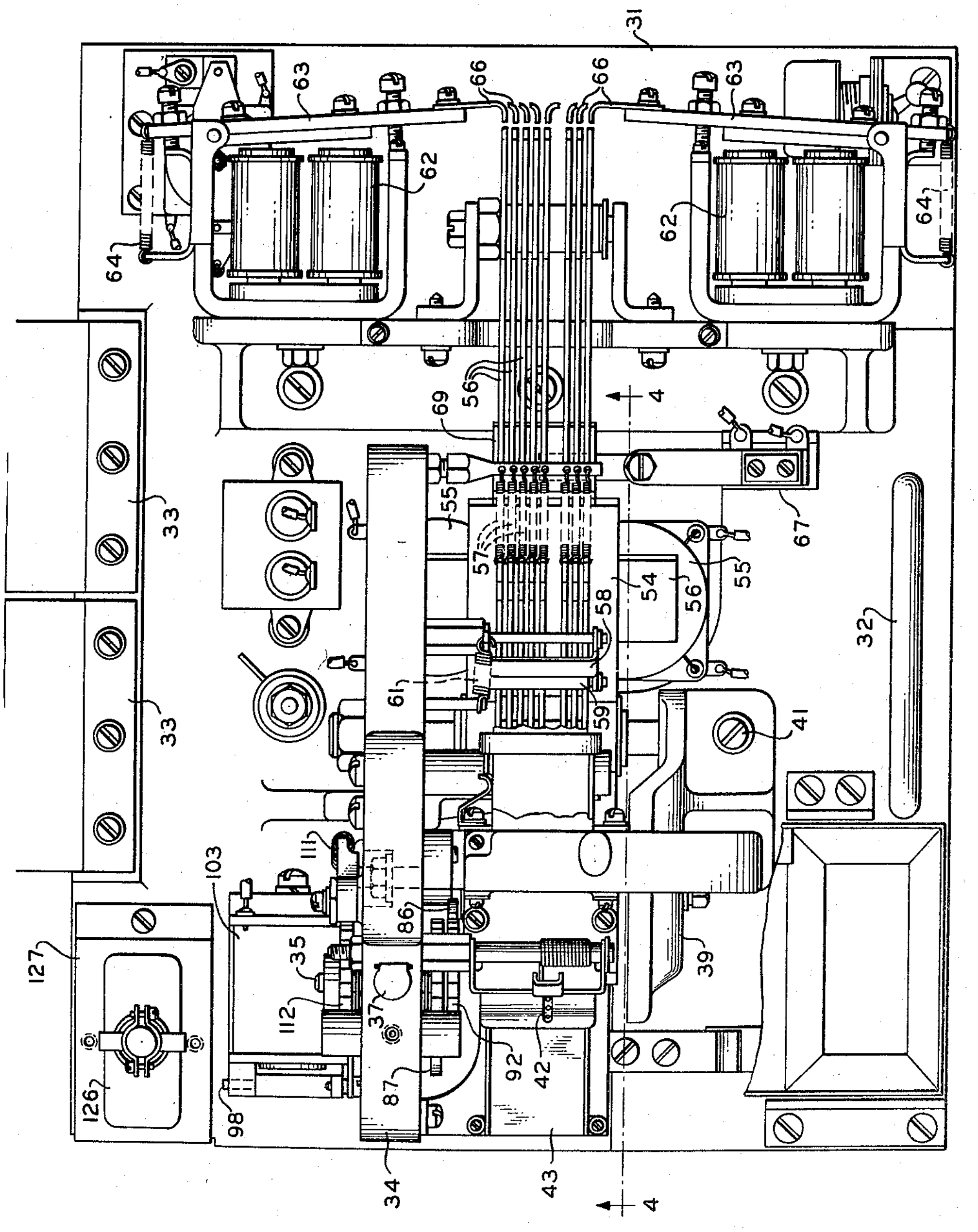
FIG. 1 is a top view of a tape reading punch.
Figure 2:
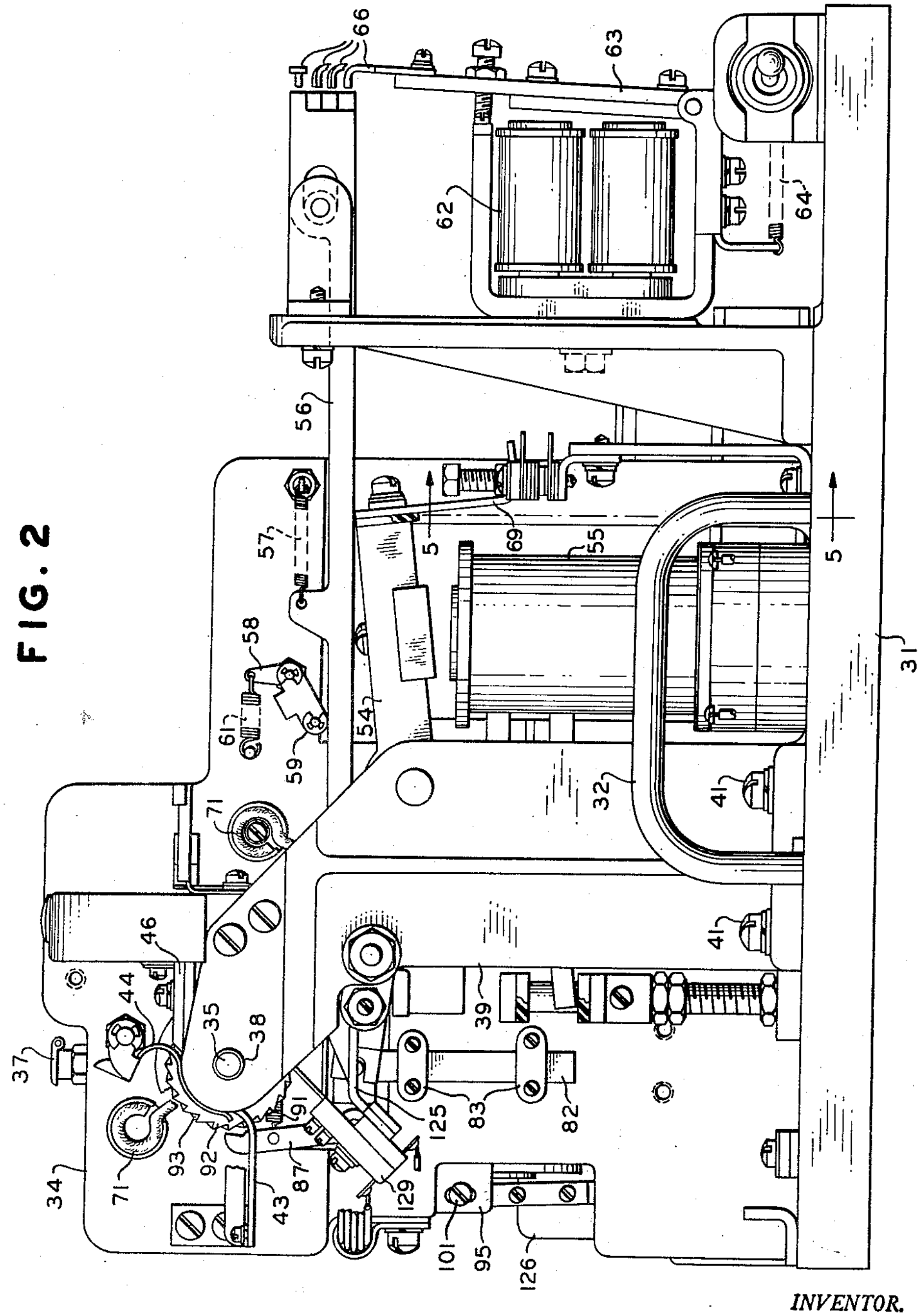
FIG. 2 is a front view thereof.
Figure 3:
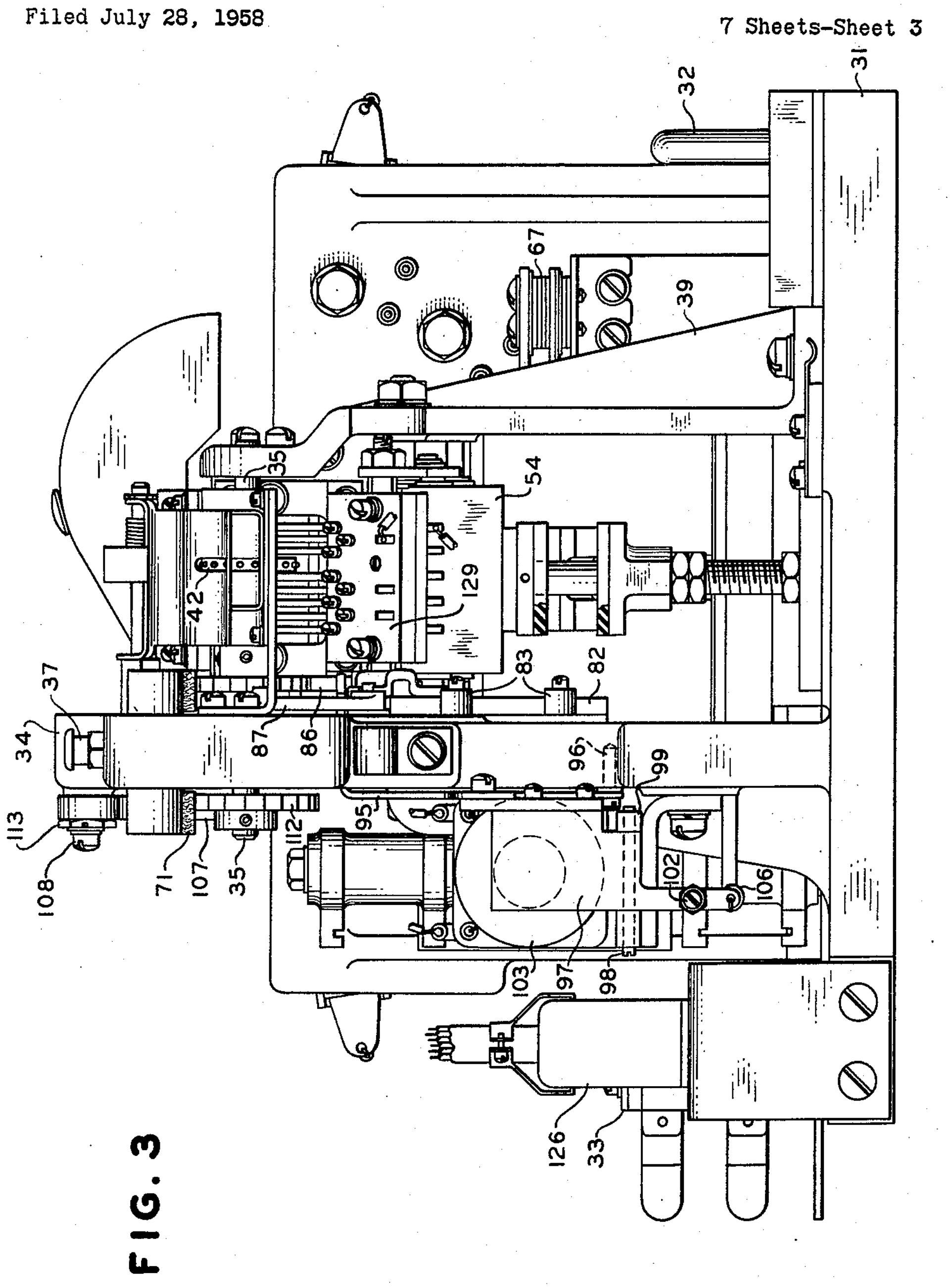
FIG. 3 is a left-end view thereof.

Turning now to the drawing, there is seen in FIG. 1 a top view of a tape reading punch constructed in accordance with the present invention. A cast metal base 31 is provided with a handle 32 and multiple circuit electrical connectors 33 so that it may be placed in circuit by plugging into a retaining rack (not shown) having mating connectors appropriately located to engage connectors 33. A wall 34 extending upwardly from base 31 has a transverse shaft 35 journalled in it and lubricated by oiler 37. The shaft is further supported in an outboard bearing 38 pressed into bracket 39 which is fastened to base 31 by screws 41, as seen also in FIG. 2 and FIG. 3. Shaft 35 has a cog wheel 42 fastened to and rotating with it as seen in FIG. 3, in detail in FIG. 7, and especially in FIG 4, where its function in drawing a paper tape between tape stripper 43 and tape tension fork 44 and between die plate 46 and stripper plate 47 is clearly evident. During passage between these latter, the tape is subjected to punching by the feed punch 48 shown enlarged in FIGS. 9 and 10, whose pin is seen to extend below the code punch pins such as 49, and within reach of punch hammer 51 of FIG. 4 which, when driven to a distance determined by the restraint of adjustable stop screw assembly 52 on the stop dog 53 of rocker 54, by the attraction of punch magnet coils 55 for the armature 60 thereon, drives the said feed hole punch through the paper immediately prior to the engagement of the resulting tape feed holes with a tooth of wheel 42.

Figure 4:
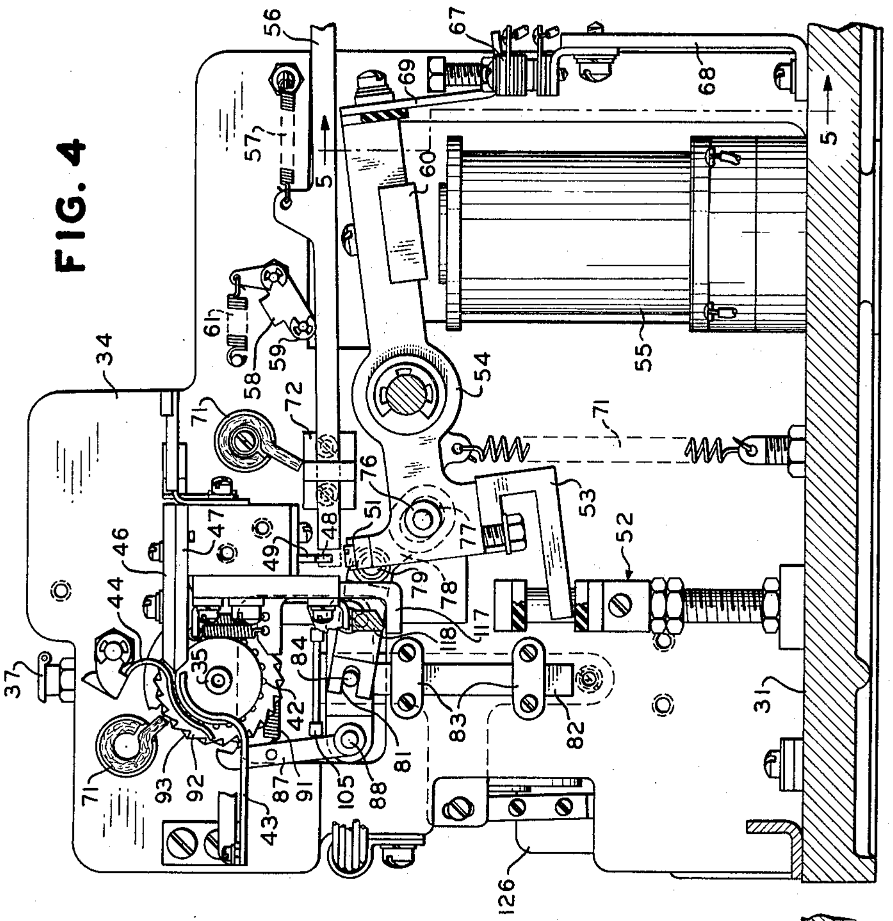
FIG. 4 is a vertical section taken on line 4—4 of FIG. 1.
Figure 10:
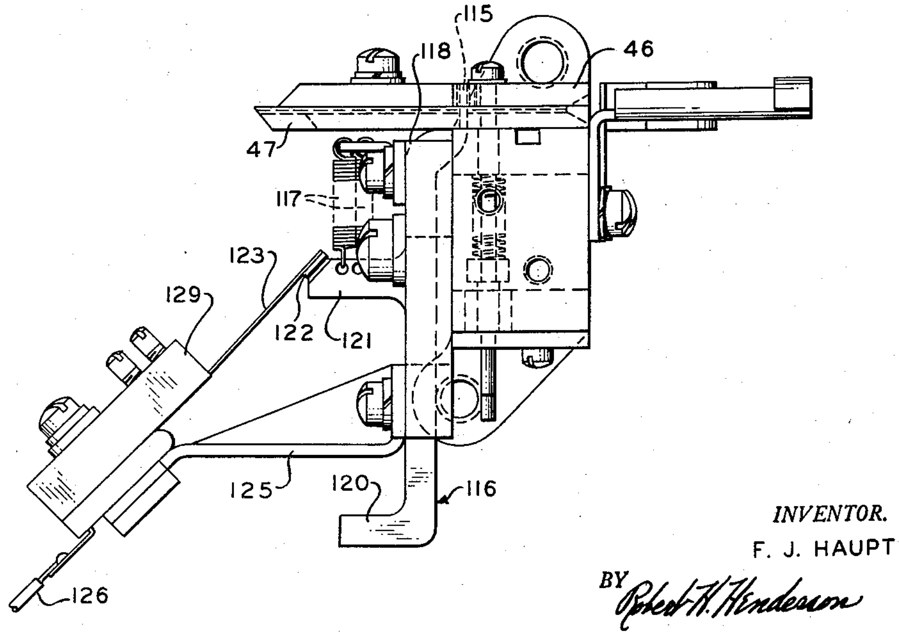
FIG. 10 is a front elevation of FIG. 9 with attached switches.
Figure 11:
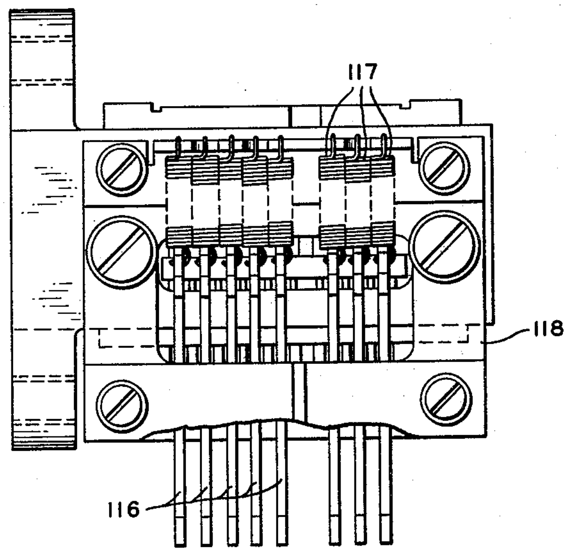
FIG. 11 is a left side elevation of a portion of FIG. 10.

The pins of code punches such as 49 are seen inn FIG. 10 to be shorter than that of feed punch 48, and thereby out of reach of punch hammer 54, so that they do not punch merely because magnet coils 55 are energized as described to punch tape holes. In FIG. 4, however, an interponent member such as 56, although normally retained out of the way to the right by a spring such as 57 is capable of being moved to the left into the position shown by dotted lines, between a character punch pin and the punch hammer 51, whereupon it can be struck by the hammer to operate a character punch. A more complete view of such interponent member is shown in FIG. 2, where also is seen a roller 59 on a bell crank 58 urged downwardly by a spring 61 to return interponents quickly to their inactive position. One of eight code magnets 62 is seen to have an armature 63 normally held open by spring 64 and capable of translating an interponent such as 56 leftward by means of a finger 66 on the armature. FIG. 1 shows the array of eight such interponent members 56 and indicates the eight code magnets such as 62 whereby they can be moved independently into code punch actuating readiness.

Figure 5:
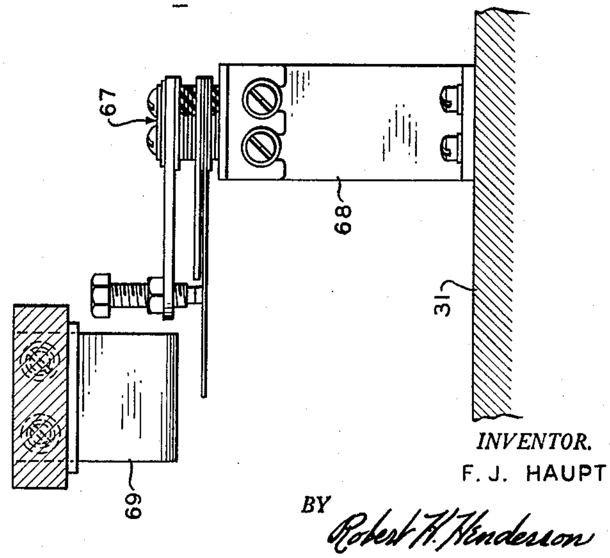
FIG. 5 is a vertical section taken on line 5—5 of FIG. 2.

At 67 in FIGS. 1, 2, 3 and 4, and in detail at FIG. 5, is shown a switch mounted on a bracket 68 which is screwed to base 31, and operated from the closed to the open position by a finger 69 fastened to but insulated from punch magnet rocker 54. Since rocker 54 is normally returned by spring 71 of FIG. 4, switch 67 is opened only upon the completion of each punching operation, for purposes to be described. Felt oiler 71 keeps the interponent members covered with an adequate film of lubricant through contact with wicks 72 loosely fastened thereto.

Figure 8:
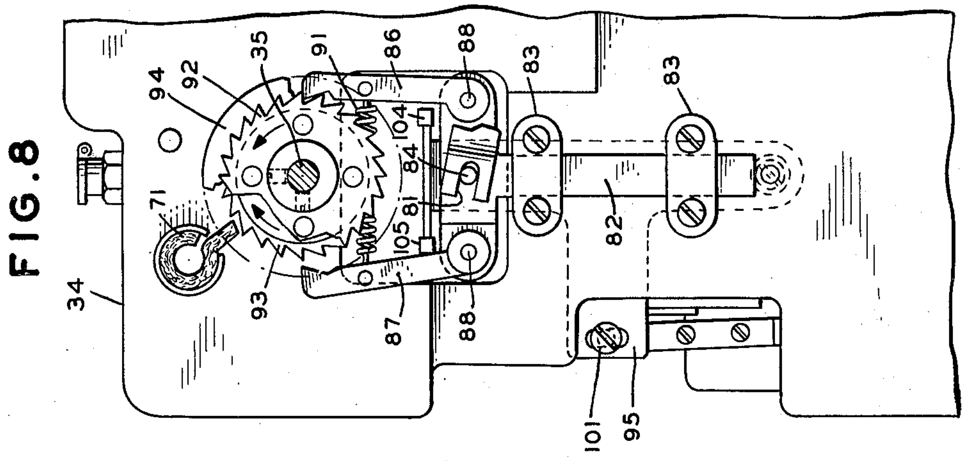
FIG. 8 is a section on line 8—8 of FIG. 7.
Figure 7:
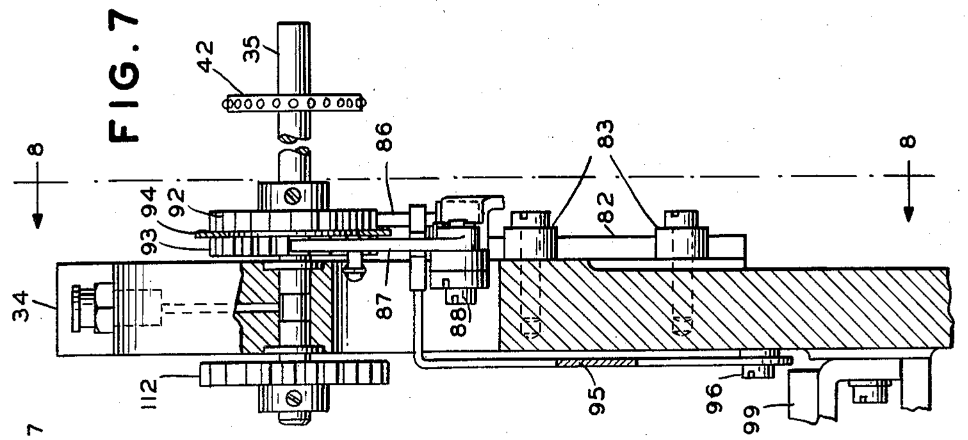
FIG. 7 is a section taken on line 7—7 of FIG. 6.
Figure 6:
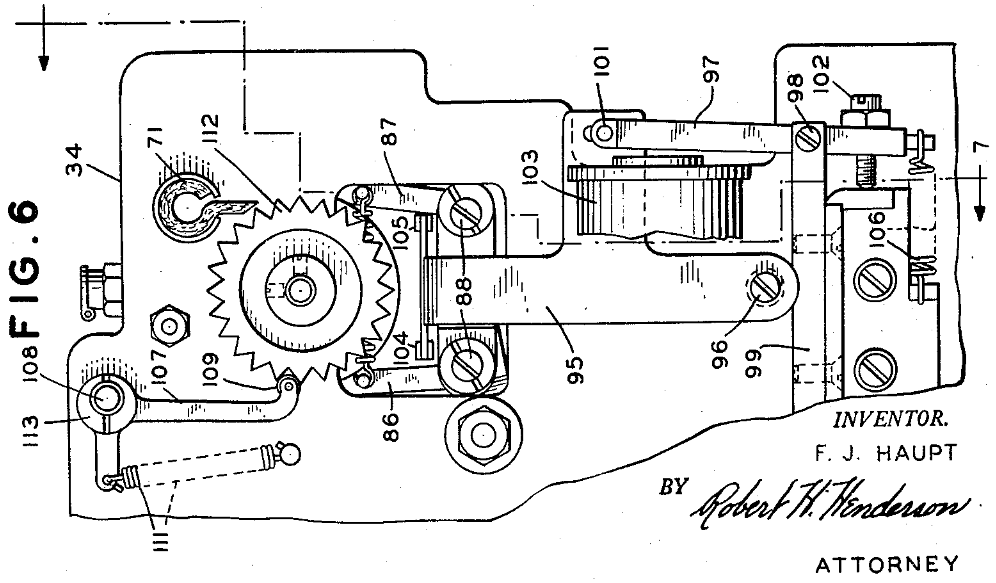
FIG. 6 is a rear view of a portion of the device with certain parts removed.

Motion of rocker 54 is also transmitted by its roller 76 to a slot 77 of link 78, pivoted to wall 34 at 79 and bearing a slot 81 at its end. A T-shaped slide 82 is retained in a vertical slideway cut in wall 34 by plates 83 screwed thereto, and has a pin 84 engaging the aforementioned slot 81, whereby it is oscillated vertically upon each motion of the punch magnet. FIGS. 7 and 8 show this construction in greater detail, where forward and reverse pawls 86 and 87 respectively are seen movably hinged at 88 to slide 82, urged toward each other by spring 91 and thus into contact with forward and reverse ratchet wheels 92 and 93 respectively, lying in different planes, separated by shroud 94, and affixed to shaft 35. As seen also in FIG. 6, a shipper arm 95, pivoted on screw 96 in wall 34 is movable by a lever 97 pivoted on a screw 98 in a fixed member 99, by means of a slotted hole therein which is engaged by a pin 101 in the end of lever 97, such motion being limited in amount by an adjustment screw 102.

Reversing magnet 103 acts to move lever 97 toward its pole piece when energized, and thus arm 95 and the hammer 104 thereon, into contact with forward pawl 86, and enough further to disengage said pawl from ratchet 92. When magnet 103 is deenergized, return spring 106 causes reverse movement of arm 95, limited by adjustable stop 102, to disengage reverse pawl 87 from ratchet 93 and permit spring 91 to again engage the forward drive pawl with its corresponding ratchet.

Bell crank 107 is mounted on the wall 34 by pivot screw 108 and bears a roller 109 at one end which is forced into contact with detent wheel 112 by the spring 111. Said detent wheel is affixed to shaft 35 as shown in FIG. 7, and together with the roller detent described, effects precise tape positioning for each character punching operation. Pivot 108 is surrounded by an eccentric bushing 113 whereby when the pivot screw is loosened the bushing can be rotated for adjustment of the center of rotation of crank 107. Felt oilers such as 71 provide a lubricant film to the working parts.

Figure 9:
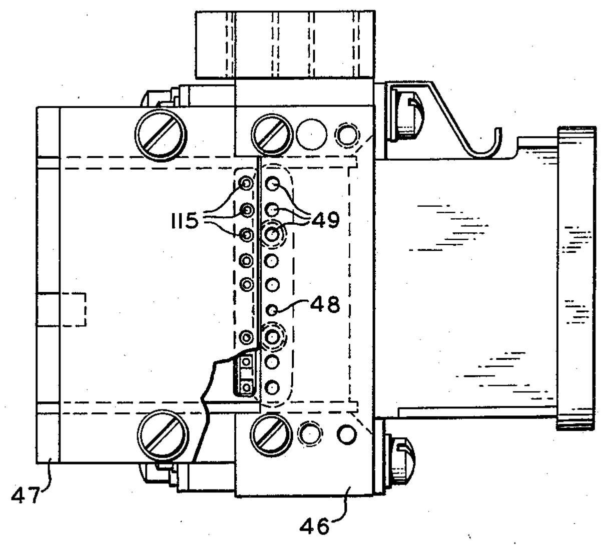
FIG. 9 is a plan view of a tape guide portion of FIG. 1, with cover removed.

In FIG. 9 it can be seen that closely adjacent to die holes 48 and 49 in the dieplate 46 there are located a corresponding set of tape reading holes 115 running transversely across the tapeway. It is through these holes that the cylindrical upper end portions of reading pins 116 of FIG. 10 are propelled by individual springs 117 when a tape hole occurs over a pin during reading. Reading pins 116 are of suitable flat stock such as oil hardened manganese tool steel, provided with an upwardly extending cylindrical pin at one end and ground flat and smooth on the opposite faces thereof. An array of eight such pins, in the present instance, fit slidably into slots milled in a fixed bronze block 118, seen also in FIG. 1, the cylindrical portions of the pins being sufficiently offset from the body portions to locate their mating tape reading holes 115 within exactly one tape character space from the punch holes 48 and 49 of FIG. 9.

Pins 116 have tail surfaces 120, FIG. 10, whereby they can be lowered out of the holes 115 against tension of spring 117 when the cross bar 118, FIG. 4, is lowered by the rocking of link 78 at every punch magnet stroke. Upon return of the rocker 54 by spring 71, paper feed occurs as described, moving the newly punched holes over the reading holes 115, and the pins enter the perforations wherever holes are encountered. Where no hole is present in the tape over the reading pin, that pin remains depressed in contact with the paper. Each pin bears a protrusion 121 carrying a contact 122 as seen in FIG. 10, and when protruding upwardly through a perforation in the tape, touches a similar contact, one of a series of blades 123 mounted in a block of insulating material 124 screwed to a fixed bracket 125. Lead wires 126 are soldered to each blade for conveying the information of hole presence in each tape position through connector 126 and socket 127 of FIG. 1 to convenient contact pins of connectors 33 for connection to external circuitry.

Figure 12:
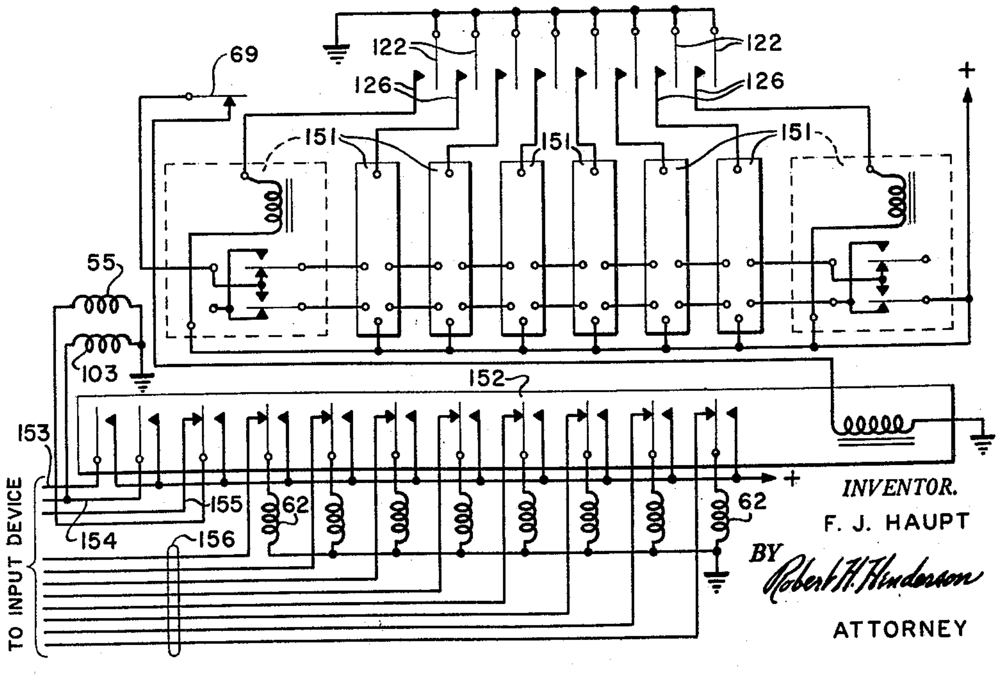
FIG. 12 is a diagram of an electrical circuit comprising a tape reading punch.

In FIG. 12 is shown an electrical wiring diagram of the instant invention exemplifying its use in punching data into a paper tape under the command of a code signal input device (not shown) which supplies positive impulses to selected ones of the code magnets 62 in a seven-unit permutation code. The input device is so constructed that the number of code holes required to be punched in the tape at any one time is an even number, or else an additional positive signal is applied to an eighth code magnet 62 so that the entire number of holes punched remains even because of the punching of such extra hole at the check level.

Such an input device of well known type being connected to positive code signal input wires 156 with the remainder of the instant device at rest and deenergized, positive currents traversing the back and the movable contacts of relay 152 flow and continue to flow through the commanded ones of code magnets 62 to ground. Corresponding interponents 56 (of FIG. 1) are thereby moved into and held in position beneath the corresponding punches.

A positive impulse then being applied from the input device to the wire 154, current flows through the punch magnet 55 to ground and the appropriate punches are operated thereby, whereupon the punch magnet armature 60 falls back to its original position advancing the tape and releasing sensing pins operating the contacts 126 into the closed position wherever a just-punched tape hole is sensed. Contacts of switch 67 of FIG. 5 are also opened by finger 69 of the punch magnet armature when the armature falls back, causing an interruption of the current flowing in the code magnets 62, and consequent restoration of interponents 56 under the action of spring 57 to their inactive position. Relays 151 are energized by such closed contacts 126 to which they are connected, and have contacts arranged in the nature of a chain of reversing switches commonly known as three-way switches. By this arrangement, as shown, an input wire to a contact terminal of the first relay of the chain undergoes one transfer between the two contact terminals of the last relay as each relay of the chain is energized. They thus apply positive potential through switch 69, closed at that time, to relay 152 if and only if an odd number of relays 151 are energized. Since as above described, only an even number of tape holes can comprise a correct punching, such energization of relay 152 is an indication of error. When so energized, relay 152 disconnects all code magnets 62 from the input device and connects them to positive source so that all holes will punch on the next operation of the punch magnet. Relay 152 also energizes reversing magnet 103 and punch magnet 55 so that the tape is backstepped and the faulty perforations over punched to produce eight tape holes. A mistake alarm is transmitted to the input device by the mistake alarm wire 153 connected to a positive source by relay 152, and because the erroneous perforations have been overpunched and thereby expunged, sensing contacts 126 operate relays 151 to deenergize relay 152 and the machine is ready to be advanced one space and reenergized to repunch the faulty character under control of the input device.

Although this invention has been described in terms of a preferred illustrative example thereof, it will be apparent to those having skill in the art that various modifications or alternative details may be employed without, however, departing from the essential spirit of the invention as disclosed. It is therefore intended that this invention shall be limited only by the attached claims.

What is claimed is:

1. In a tape perforator, means responsive to an impressed signal impulse for punching successive sets of code perforations in a tape, electromagnetically energizable interponent means for code perforation punch arming movable out of engagement therewith only by electromagnetic deenergization, separate sensing means operative between successive tape punchings for sensing a last-punched code perforation set, and means responsive to said sensing means for back stepping said tape and overpunching a previously punched area thereof with a predetermined code.

2. In a tape reading tape punch, energizable punch magnet means, rocking beams means actuated thereby, a plurality of interponent members resiliently retained for advancement into the path of travel of said rocking beam means and for operation thereby, code magnets advancingly linked to said interponent members respectively and a switch electrically linked to the said magnets having a pair of contacts arranged in a holding circuit for each said code magnet for holding circuit release upon punch magnet deenergization, operatively connected to said rocking beam means, tape punch means operable by said rocking beam means through contact with said interponent members, tape feed sprocket means connected to the said rocking beam means for stepwise tape feed on rocking motion thereof, die plate means having perforations for said tape punch means and having corresponding perforations spaced one tape step distant therefrom, tape hole feeler pins resiliently urged and mounted for advancement through such corresponding perforations, feeler pin retractor means mounted for engagement with said pins on rocking motion of said rocking beam means, and feeler pin position detector switches mounted for actuation by advancement of said pins.

3. In a magnetic tape punch for printing telegraph, a punch magnet, a rocking beam centrally hinged adjacent thereto, an armature affixed to one end of said beam in attractive relationship with said punch magnet for rocking said beam, a crossbar affixed to the other end of said beam, a plurality of punch pins mounted beyond the path of travel of said crossbar and equally spaced therefrom, an interponent member for each of said pins, mounted for projection by advancement into each such space, and code magnets each having a movable armature, one of said armatures being in connection with each of said interponent members for projection thereof into said space to actuate a respective punch pin on motion of said rocking beam only after a corresponding said magnet has been energized a switch having operating portions linked to said rocking beam and connected for opening upon completion of punching motion of said rocking beam, a rocking link centrally pivoted and operatively connected to said rocking beam, a forward sprocket pawl linked to said rocking link, a reverse sprocket pawl linked to said rocking link, ratchet wheels for said pawls, and a reversing link hingedly interconnecting said pawls and a reversing magnet having a movable armature linked to said reversing link for magnetic pawl selection.

4. In a tape punch having readout means for detecting a character directly after it is punched, reversible tape feed means comprising a sprocket, a forward driving ratchet wheel and a backward driving ratchet wheel affixed to said sprocket a punch powering armature reciprocably hinged for electromagnetic tape punch driving by acyclic punching impulses, a sliding yoke operatively connected to said armature, a forward and a backward pawl for said ratchet wheels respectively, pivoted on said sliding yoke and linked together for alternative operation, and an electromagnetic actuator having an armature linked to said pawls for reversal of rotation of said sprocket.

5. In an automatic punch for impressing code markings on paper tape, electromagnetic rocker beam means, a plurality of liftable interponent means individually advanceable into engagement for lifting by said rocker beam means, separate electromagnet means for advancing each said interponent means, switch means on said rocker beam means for releasing said electromagnet means, a plurality of spaced punching means located for respective operation by lifting of advanced interponent means, tape sprocket means mounted in the line of tape travel for tape traverse across said punching means, a forward ratchet and a reverse ratchet wheel both drivingly attached to said sprocket means, forward and reverse pawls operatively connected to said rocker beam means and alternatively engageable with said forward and reverse ratchet wheels respectively, and an electromagnet operatively attached to said pawls for alternative engagement thereof with said ratchet wheels for forward and reverse tape feeding motion.

6. In a telegraph storage tape punch, remotely settable and unsettable and energizable code punching means, separate punch mark sensing means operative for punch mark reading upon punching means deenergization, comprising sensing pins located for movement into punch mark engagement of a last-punched mark, and switch means located for actuation respectively by such motion of said sensing pins, remotely reversible tape stepping means comprising a tape sprocket, and punch actuated pawl and ratchet sprocket drive means, and switch means on said code punching means operable on deenergization thereof for releasing a set-in code.

7. A code marking machine for impressing permutation code characters on a paper tape comprising a plurality of solely remote controllable tape impressing marking means, activating members for each of said marking means, energizable by code selection for individual advancement into marking means engagement only during energization, tape transport means remotely operable stepwise in either direction, a separate set of mark transmitting code mark sensing pins located for operation one tape step distant from said marking means to sense a last impressed tape mark, and means to defeat said energization upon completion of a tape mark.

References Cited in the file of this patent

UNITED STATES PATENTS

| | | |
|---|---|---|
| 2,213,223 | Krum et al. | Sept. 3, 1940 |
| 2,517,995 | Fitch | Aug. 8, 1950 |